US006980885B2

(12) United States Patent
Ye et al.

(10) Patent No.: US 6,980,885 B2
(45) Date of Patent: Dec. 27, 2005

(54) ROUTING SHIPMENTS ACCORDING TO CRITICALITY

(75) Inventors: Jian Ye, Arlington, MA (US); Todd Christopher Leih, Cambridge, MA (US); Pei Lu, Somerville, MA (US); Roy J. Szabady, Cambridge, MA (US)

(73) Assignee: i2 Technologies US, Inc., Dallas, TX (US)

( * ) Notice: Subject to any disclaimer, the term of this patent is extended or adjusted under 35 U.S.C. 154(b) by 290 days.

(21) Appl. No.: 09/962,663

(22) Filed: Sep. 24, 2001

(65) Prior Publication Data

US 2003/0060924 A1 Mar. 27, 2003

(51) Int. Cl.$^7$ ................................................. G07F 7/00
(52) U.S. Cl. ....................... 700/217; 700/215; 700/216; 700/218
(58) Field of Search .............................. 700/215, 216, 700/217, 218; 705/6, 7, 8

(56) References Cited

U.S. PATENT DOCUMENTS

| | | | | |
|---|---|---|---|---|
| 5,093,794 A | * | 3/1992 | Howie et al. ................ | 700/100 |
| 5,237,158 A | * | 8/1993 | Kern et al. ................... | 705/45 |
| 5,403,147 A | * | 4/1995 | Tanaka ........................ | 414/786 |
| 5,548,518 A | * | 8/1996 | Dietrich et al. ............. | 700/100 |
| 6,285,951 B1 | * | 9/2001 | Gaskins et al. ............. | 701/209 |
| 6,401,078 B1 | * | 6/2002 | Roberts et al. .............. | 705/28 |
| 6,571,213 B1 | * | 5/2003 | Altendahl et al. ............ | 705/1 |
| 6,622,127 B1 | * | 9/2003 | Klots et al. ................... | 705/28 |

OTHER PUBLICATIONS

G. Laporte, "CRT-745 The Vehicle Routing Problem: An Overview of Exact and Approximate Algorithms," Centre de recherche sur les transports—Publication #745, 35 pages, Feb. 1991.

C.H. Papadimitrion, K. Steiglitz, "Introduction on Local Search," Combinational Optimization Algorithms and Complexity, Prentice-Hall, 2 pages, 1982.

(Continued)

*Primary Examiner*—Donald P. Walsh
(74) *Attorney, Agent, or Firm*—Brian E. Harris; James E. Walton (57) ABSTRACT

A computer-implemented method for routing shipments according to criticality includes accessing an initial solution to an optimization problem of routing multiple shipments to multiple locations using multiple vehicles, the initial solution including multiple loads such that each shipment is routed within exactly one load and a global cost across all loads is minimized, the initial solution being generated independent of the criticality of the shipments. Into each of one or more critical loads in a current solution, one or more non-critical shipments are inserted that are within a neighborhood of the critical load, a critical load being a load containing at least one critical shipment. One or more local search operations are executed to improve the initial solution, the operations including at least one of: (a) splitting each of one or more selected critical loads in a current solution into two new critical loads; (b) for each of one or more selected critical load pairs in a current solution, move a sequence of stops from one critical load in the pair to the other critical load in the pair and/or swap two sequences of stops between the critical loads in the pair; and (c) for each of one or more selected critical loads in a current solution that are indirect critical loads having at least one in-transit stop, break up the indirect critical load into a plurality of new direct critical loads having no in-transit stops and execute operation (b) on each of one or more selected critical load pairs, each selected critical load pair including at least one new direct critical load.

35 Claims, 6 Drawing Sheets

OTHER PUBLICATIONS

R.K. Ahuja et al., "Traveling Salesman Problem," Chapter 16: Lagrangian Relaxation and Network Optimization, Section 16.5 Applications of Lagrangian Relaxation; textbook title *Network Flows: Theory, Algorithms, and Applications*, ISBN No. 1-13-02776507, includes textbook cover page, ISBN No. page and pp. 623-625 5 pages total, © date: 1993.
Taiwan, First Office Action, English version, 1 page, Nov. 28, 1002.

\* cited by examiner

ROUTING SHIPMENTS ACCORDING TO CRITICALITY

TECHNICAL FIELD OF THE INVENTION

This invention relates in general to computer-implemented logistics, and more particularly to routing shipments according to criticality.

BACKGROUND OF THE INVENTION

Routing of shipments between businesses and other locations is a significant problem in commercial environments. The problem of optimally routing shipments can be constructed as the well-known Vehicle Routing Problem (VRP), which is an important optimization problem in operations research. VRPs are an extension of the well-known Travelling Salesman Problem (TSP). In general, VRPs are described as the problem of delivering multiple shipments to multiple locations using multiple vehicles. In solving VRPs, the goals is to define a set of routes subject to capacity, time, or other suitable constraints such that each shipment is delivered in exactly one of the routes while the global cost of these routes is minimized. VRPs belong to a class of difficult problems, referred to as NP-hard problems, for which no efficient solution algorithms are known.

Certain exact algorithms and heuristic procedures have been proposed for solving VRPs. Due to computer processing power and other limitations, the exact algorithms can only be used to solve relatively small VRPs. Exact algorithms also often lack flexibility. Local search heuristics have been effective for solving certain large-scale real-world problems. The general framework for a local search includes two phases: (1) route construction and (2) route improvement. In route construction, initial routes are constructed using various heuristics, such as insertion heuristics. In the improvement phase, local search operations are applied to initial routes to obtain better routes. The most commonly used operations are moving a sequence of stops from one route to another and swapping two sequences of stops between two routes. These operations belong to a class of operations referred to as k-opt.

Although the previous models for solving VRPs have been useful for certain applications, many important practical issues have not been addressed. As a result, it remains important to extend VRP formulation according to real world transportation needs and to develop corresponding solution strategies.

SUMMARY OF THE INVENTION

According to the present invention, disadvantages and problems associated with prior techniques for routing shipments may be reduced or eliminated.

In one embodiment of the present invention, a method for routing shipments according to criticality includes accessing an initial solution to an optimization problem of routing multiple shipments to multiple locations using multiple vehicles, the initial solution including multiple loads such that each shipment is routed within exactly one load and a global cost across all loads is minimized, the initial solution being generated independent of the criticality of the shipments. Into each of one or more critical loads in a current solution, one or more non-critical shipments are inserted that are within a neighborhood of the critical load, a critical load being a load containing at least one critical shipment. One or more local search operations are executed to improve the initial solution, the operations including at least one of: (a) splitting each of one or more selected critical loads in a current solution into two new critical loads; (b) for each of one or more selected critical load pairs in a current solution, move a sequence of stops from one critical load in the pair to the other critical load in the pair and/or swap two sequences of stops between the critical loads in the pair; and (c) for each of one or more selected critical loads in a current solution that are indirect critical loads having at least one in-transit stop, break up the indirect critical load into a plurality of new direct critical loads having no in-transit stops and execute operation (b) on each of one or more selected critical load pairs, each selected critical load pair including at least one new direct critical load.

Particular embodiments of the present invention may provide one or more technical advantages. Particular embodiments may generate a solution to a modified VRP that takes the criticality of shipments into consideration, the solution preferably specifying desirable relatively full executable loads for a substantial number of critical shipments. In particular embodiments, the solution can be considered a first order approximate solution to a multiple time period VRP. Particular embodiments use a number of local search operations to identify desirable solutions to the problem. These local search operations may be relatively simple, flexible, and effective, yielding good solutions for large-scale real world scenarios in a reasonable amount of time. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
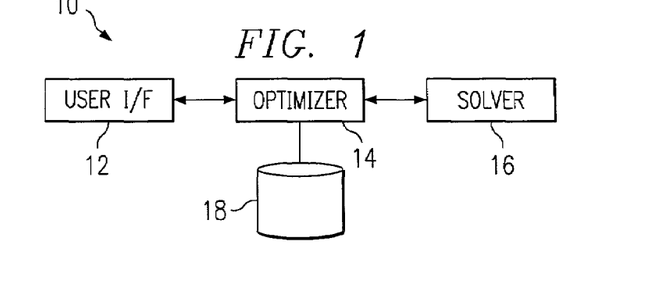
FIG. 1 illustrates an example system for routing shipments according to criticality.

FIG. 1 illustrates an example system 10 for routing shipments according to criticality. In one embodiment, system 10 includes a user interface 12 for receiving input from and providing output to one or more users associated with system 10. An optimizer 14 generates a solution to a modified VRP that incorporates criticality constraints according to the present invention. Optimizer 14 uses a commercially available or other appropriate solver 16 to generate an initial solution to a basic VRP problem, which optimizer 14 improves through execution of various operations to generate the solution to the modified VRP. Although optimizer 14 and solver 16 are described as being separate software components, the present invention contemplates these components being integrated, in whole or in part. Optimizer 14 and solver 16 may execute on one or more processors within the same or different computer systems. Database 18 provides data storage for system 10. For example, database 18 may store information representing shipments to be routed, parameters that optimizer 14 will use to execute operations in generating the solution, and a strategy script or other suitable instructions specifying the order in which optimizer 14 will execute operations. Although the term "database" is used, database 18 may include one or more databases, memories, or other suitable data storage arrangements at one or more appropriate locations within the same or different computer systems as other components of system 10.

As an example of the problem addressed according to the present invention, consider the typical situation in which shippers solve VRPs periodically to execute transportation plans. In general, VRPs may be described as the problem of delivering multiple shipments to multiple locations using multiple vehicles. In general, a load (also referred to as a route) may be defined as a movement of one or more shipments between two or more stops. In solving VRPs, the goal is to define a set of loads subject to capacity, time, or other constraints such that each shipment is delivered in exactly one of the loads while the global cost of these loads is minimized. VRPs belong to a class of difficult problems, referred to as NP-hard problems, for which no efficient solution algorithms have been developed. It is common for shippers to have shipments that do not need to be executed in a current time period. Thus, in addition to determining a set of loads containing these shipments, decisions have to be made concerning which loads will be executed in the current time period and which will instead be executed in future time periods. In full generality, the above problem is a complex multiple time period VRP, usually with forecasted shipments in future time periods.

A shipment may be called "critical" if it must be executed in the current time period, otherwise it may be called "future" (i.e. "non-critical"). A load may be called "critical" if it contains one or more critical shipments. A load may also be called "executable" if it is acceptable according to certain business rules, for example only and without limitation, more than forty thousand pounds and less than four stops in transit. The present invention considers an approximation to the multiple time period VRP described above by solving a VRP only for the current time period. Intuitively, it is desirable to build critical loads with significant consolidation, for example, full vehicles, straight routes, and few stops, because critical loads by definition must be executed. Moreover, it is also desirable to build as many as possible executable noncritical loads so that they can be considered for execution in the current time period, for example, to increase consolidation. Thus, in one embodiment, system 10 uses the following primary objectives: (1) minimize the unit cost for critical loads, then (2) maximize the total volume of executable loads. It may be desirable to execute non-critical executable loads, for example, to decrease inventory, increase visibility, and increase the time available to negotiate with carriers to transport these loads. The problem solved according to the present invention is a modified VRP incorporating criticality constraints as described herein.

In operation of system 10, in an initialization stage, optimizer 14 accesses the information representing the shipments to be routed and provides this information to solver 16 for generation of an initial solution to a basic VRP. The initial solution, for example, may include only critical shipments (thus excluding future shipments) or may include all shipments regardless of criticality. Significantly, because the initial solution is a solution to a basic VRP, the initial solution treats all the shipments within the problem space (i.e. either all critical shipments or all shipments) equally and does not distinguish among the shipments based on their criticality. Optimizer 14 receives the initial solution from solver 16. Before, substantially simultaneous with, or after causing the initial solution to be generated, optimizer 14 accesses the parameters optimizer 14 will use to execute one or more operations and accesses a strategy script or other suitable instructions that specify the order in which optimizer 14 will execute the operations. Optimizer 14 may receive this information from a user through user interface 12, retrieve the information from database 18, or access the information in any other appropriate manner.

In a construction stage, optimizer 14 may execute a Move Future Shipments operation that attempts to greedily fill each critical load with future shipments in an appropriate neighborhood of the critical load. The Move Future Shipments operation may or may not be executed, depending on the strategy optimizer 14 is pursuing, as specified in the strategy script or other suitable instructions. In one embodiment, it is desirable to execute the Move Future Shipments operation whether the initial solution is for a VRP that incorporates only critical shipments or for a VRP that incorporates all shipments. For example, if solver 16 generates an initial solution to a VRP that incorporates only critical shipments, then execution of the Move Future Shipments operation may be desirable to minimize global plan cost by filling light critical loads with non-critical shipments. If the initial solution incorporates all the shipments (without regard to criticality), then the Move Future Shipments operation may be desirable to minimize global plan cost by moving certain non-critical shipments from non-critical loads to light critical loads. The Move Future Shipments operation is described more fully below with reference to FIGS. 2 and 3.

In an improvement stage, optimizer 14 may execute one or more appropriate local search operations to improve the initial solution (possibly as modified by the Move Future Shipments operation). In essence, local search heuristics are based on trial and error. In general, given an instance (F, c) of an optimization problem, where F is some feasible set of solutions and c is a cost mapping, a local search algorithm involves choosing a neighborhood $N(x)$, which maps a solution x to a subset of F:

$$N:F \to 2^F.$$

The neighborhood $N(x)$ is searched at a solution $x \in F$ for improvements using the logic: improve(x) is true if there exists any $y \in N(x)$ such that $c(y)<c(x)$, but is false otherwise. The general local search algorithm can be summarized:

Begin
    x: some initial starting point in F;
    while improve(x)=true
        x=improve(x);
    return t;
End As indicated above, the local search algorithm starts at some initial feasible solution x∈F and uses the subroutine improve( ) to search for a better solution in the neighborhood of that solution. So long as an improved solution exists, the improved solution is adopted it and the neighborhood search is repeated for the new solution. When a local optimum is reached, the local search algorithm stops. To apply this approach to a particular problem, we must first decide how to obtain an initial feasible solution. Next, we must choose a "good" neighborhood for the problem at hand and a method for searching it. This choice is usually guided by intuition, because very little theory is available as a guide. The design of effective local search algorithms has been, and remains, very much an art.

In one embodiment, during the improvement stage, optimizer 14 may execute one or more of the following local search operations, without limitation: (1) a Split Critical Loads operation that, for a single execution, splits a critical load into two loads if there are a sufficient number of future shipments in the neighborhood of the critical load to create two executable loads; (2) an Optimize Critical Loads operation that, for a single execution, moves a sequence of stops from one load to another or swaps two sequences of stops between two loads (and may remove future shipments to make room for critical shipments or add future shipments to fill critical loads); and (3) a Re-Optimize Critical Loads operation that breaks up a light critical load into a set of direct loads (i.e. having no in-transit stops), then applies the Optimize Critical Loads operation to the new loads along with all the other critical loads. These local search operations are described more fully below with reference to FIGS. 4 through 9. Although particular local search operations are described, the present invention contemplates modifications to these operation and also contemplates more, fewer, or other operations being executed according to particular needs.

In a particular embodiment, according to the strategy script or other suitable instructions, optimizer 14 applies the Split Critical Loads operation to each critical load within the initial solution (preferably as modified by the Move Future Shipments operation). Each execution of the Split Critical Loads operation is for a single critical load. The operation is preferably applied to the critical loads in order of priority, such that in one embodiment the most important and fullest critical loads may be split first. Once the Split Critical Loads operation has been applied to all critical loads in the current best solution, optimizer 14 selects a new best solution. Still according to the strategy script or other instructions, optimizer 14 applies the Optimize Critical Loads operation to appropriate pairs of critical loads in the current best solution (selected after executing the Split Critical Loads operation). Each execution of the Optimize Critical Loads operation is for a single pair of critical loads. Once the Optimize Critical Loads operation has been applied to all appropriate pairs of critical loads in the current best solution, optimizer 14 selects a new best solution. Still according to the strategy script or other instructions, optimizer 14 next applies the Re-Optimize Critical Loads operation to each critical load in the current best solution (selected after executing the Optimize Critical Loads operation). Each execution of the Re-Optimize Critical Loads operation is for a single critical load. The operation may be applied to the critical loads in order of priority, such that the most important and fullest critical loads may be broken up first. Once the Re-Optimize Critical Loads operation has been applied to all critical loads in the current best solution, optimizer 14 selects a new best solution. In this particular embodiment, this solution is deemed the solution to the modified VRP incorporating criticality constraints. Those skilled in the art will appreciate that, although a particular solution strategy has been described, the present invention encompasses any solution strategy falling within the scope of the claims appended hereto.

Before describing the operations in more detail, it may be useful to introduce the following terminology applicable in certain embodiments:

Insertion Percentage: Given a load, a shipment, and a location to insert the shipment, the insertion percentage is calculated as the percentage distance increase of the load as the result of inserting the shipment at the specified location.

Percent Full: Given a vehicle having a weight capacity of MaxWeight and a volume capacity of MaxVolume. The percent full of a shipment is the greater of the ratios weight/MaxWeight and volume/MaxVolume. Similarly, we can define percent full for a load as its percent full at its origin (i.e. before any shipments in the load are delivered to their destinations).

Unit Cost: Unit cost is the cost per percent full per distance. For example, assume a load has two shipments and costs $300. Suppose also that each shipment is 50% full and one has the distance 100 miles, the other 200 miles. Then the cost per percent full per mile is $300/(0.5*100+0.5*200)=2$.

Rating Engine: In practice, the cost of a load may depend on many factors, including mileage, number of stops, carrier, equipment, geographic region, etc. For simplicity, we assume there is an external rating engine (not explicitly shown) that is capable of returning the cost of a load to system 10 given the various parameters of the load as input.

Scheduling Engine: In addition, loads will be subject to various time window constraints. For example, shipments will usually have pickup and delivery dates, and locations will have business hours. For simplicity, we assume there is an external scheduling engine (not explicitly shown) that is capable of checking for scheduling violations for a load.

Neighborhood: The definition of a neighborhood of a load may be important for local searching. Though the present invention provides advantages when used in the context of general neighborhoods, it may be more desirable to choose a particular simple neighborhood for ease of presentation. Thus, assuming only one origin, the neighborhood for a load may be defined to include the set of loads/shipments whose destinations are within a MaxNeighborhoodDistance of the load's destination.

Priority: As an extension of criticality, in one embodiment a priority may be associated with each non-critical (future) shipment, which preferably takes a nonnegative integer value. Among non-critical (future) shipments, some shipments are more important than others (meaning it is more important that these shipments be shipped sooner rather than later). The more important a shipment, the lower the integer value of its priority. The priority of a load may be defined as the highest priority of all its shipments.

Figure 2:
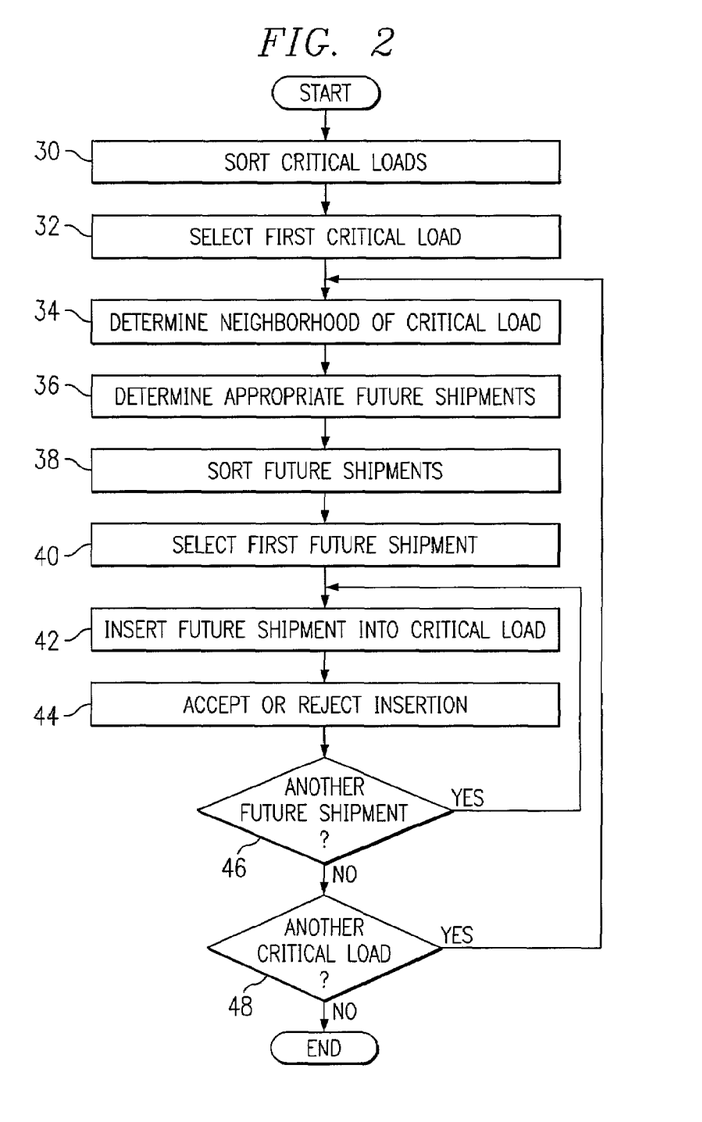
FIG. 2 illustrates example execution of a Move Future Shipments operation.

FIG. 2 illustrates example execution of the Move Future Shipments operation by optimizer 16. In general, as noted above, the Move Future Shipments operation implements an extension of known insertion heuristics to insert future shipments into critical loads associated with an existing solution, such as the initial solution optimizer 14 receives from solver 16. In a particular embodiment, the Move Future Shipments operation uses MaxNeighborhoodDistance, MaxInsertionPercent, and MaxCostIncreaseAllowed parameters. The parameters may be received from a user through user interface 12, retrieved from database 18, or accessed in any other suitable manner. As an example, a shipper may specify a MaxCostIncreaseAllowed value such that a future shipment can be inserted into a critical load even if doing so increases the total cost of the plan as determined by system 10, because the shipper may know based on its experience or perhaps more complete internal data available to the shipper that inserting the future shipment will in reality decrease the total cost of the plan.

Example execution of the Move Future Shipments operation begins at step 30, where optimizer 16 sorts all critical loads within the existing solution by priority, if any, and then within priority by decreasing percent full. This preferably allows the most important and fullest critical loads to be filled with shipments first. Optimizer 16 selects a first critical load at step 32, determines its neighborhood at step 34 as specified by the MaxNeighborhoodDistance parameter, and determines all the future shipments whose destinations are within MaxNeighborhoodDistance of the critical load's destination and are not already in critical loads at step 36. At step 38, these future shipments are sorted by decreasing order of priority if any, then by increasing order of insertion percentage, then by decreasing order of percent full. Optimizer 16 selects a first future shipment at step 40 and inserts the future shipment into the critical load at step 42. This insertion is accepted if the resulting load is valid according to any applicable constraints and the insertion also does not increase the total cost of the plan, relative to the existing solution, by more than the value of the MaxCostIncreaseAllowed parameter. Optimizer 16 will either accept or reject this insertion at step 44.

If there is another future shipment to consider at step 46, then the execution returns to step 42 and iterates until all the appropriate future shipments have been considered. If there is another critical load to consider at step 48, then the execution returns to step 34 and iterates until all critical loads have been considered, at which point execution of the Move Future Shipments operation ends. Although the Move Future Shipments operation is described as involving each critical load and each of the future shipments determined at step 36, the present invention contemplates this operation being executed using any suitable subset of critical loads within an existing solution and any suitable subset of future shipments.

Figure 3:
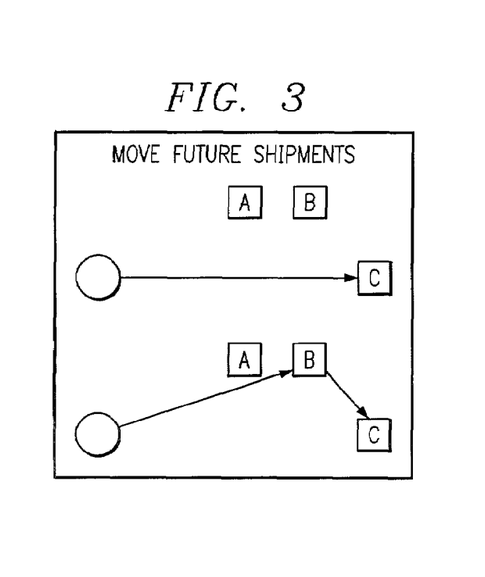
FIG. 3 illustrates a simple example scenario involving execution of a Move Future Shipments operation.

FIG. 3 illustrates a simple example scenario involving execution of the Move Future Shipments operation. As shown in the upper diagram of FIG. 3, suppose there is a critical load to C being considered and that future shipments to A and to B have the same priority. In this example, as shown in the lower diagram, the shipment to B will be chosen for insertion into the critical load before the shipment to A, since the shipment to B has a lower insertion percentage than the shipment to A.

Figure 4:
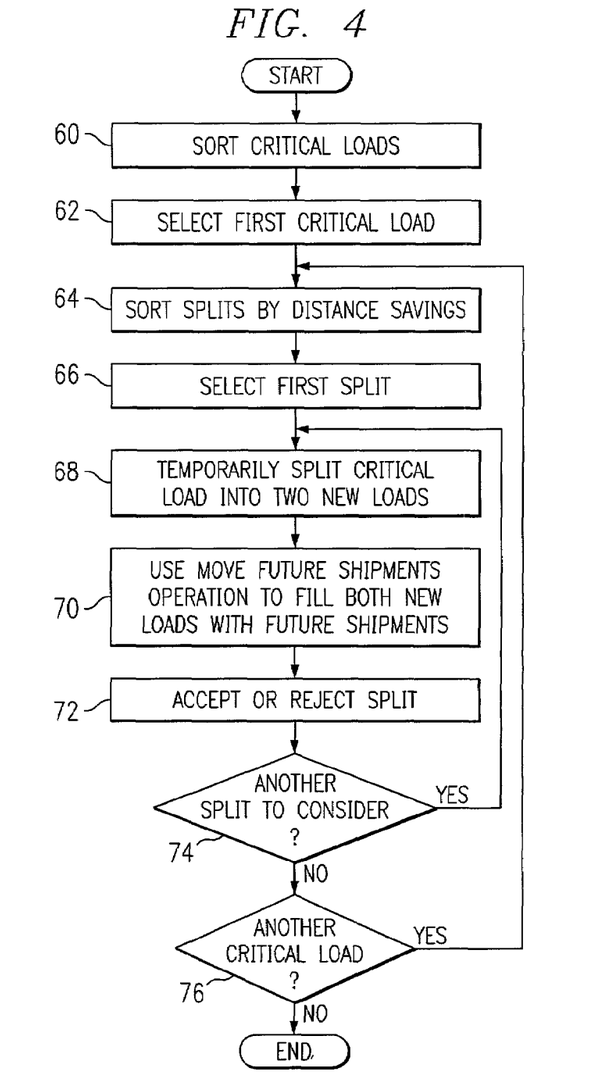
FIG. 4 illustrates example execution of a Split Critical Loads operation.

FIG. 4 illustrates example execution of the Split Critical Loads operation by optimizer 16. In general, as noted above, the Split Critical Loads operation splits critical loads in an existing solution into new critical loads (for example, creating two new critical loads for each critical load split), and uses the Move Future Shipments operation to fill the resulting critical loads. In one embodiment, the Split Critical Loads operation may involve MinPercentFullRequired, MaxNeighborhoodDistance, and MaxInsertionPercent parameters, without limitation. These parameters may be received from a user using user interface 12, retrieved from database 18, or accessed in another suitable manner. The first parameter (MinPercentFullRequired) is preferably used to define whether a load is executable. However, one or more other or additional parameters may be used to define whether a load is executable, where appropriate. The second parameter (MaxNeighborhoodDistance) and third parameter (MaxInsertionPercent) are, as described in more detail below, used for the Move Future Shipments operation after a critical load has been split.

Example execution of the Split Critical Loads operation begins at step 60, where optimizer 16 may sort all the critical loads within the existing solution by priority, if any, and then within priority by decreasing percent full, as also described above with reference to the Move Future Shipments operation. This may allow the most important and fullest critical loads to be split first. Alternative embodiments may omit such sorting of critical loads. Optimizer 16 selects a first critical load at step 62. In a particular embodiment, the critical load must be multi-stop and have a percent full greater than MinPercentFullRequired. Suppose a load has N stops, in one embodiment only split sub-operations that split the critical load into two loads with stops (1, 2, ..., k) and (k+1, ..., N) are considered. There are N−1 such split sub-operations. For a split sub-operation at stop k, the distance savings of the split sub-operation may be calculated as:

distance savings=distance between stop $k$ and stop $k$+1.

At step 64, optimizer 16 sorts all the N−1 possible split sub-operations for the critical load by distance savings. Optimizer 16 may estimate whether it is possible for a split sub-operation to create two executable loads by examining at all future shipments in the neighborhood for the critical load. Any split sub-operations resulting in non-executable loads may be discarded.

Optimizer 16 selects the first split sub-operation (preferably the one with the largest distance savings) at step 66, makes temporary changes to split the critical load into two new loads at step 68, and then uses the Move Future Shipments operation with parameters (MaxNeighborhoodDistance, MaxInsertionPercent, 0) to fill both new loads with future shipments at step 70. If both new loads have a percent full greater than MinPercentFullRequired and the unit cost across all the critical loads is improved, then all the temporary changes associated with the split sub-operation are accepted. Otherwise, the temporary changes are discarded and the next split sub-operation is attempted. Optimizer 16 either accepts or rejects the split sub-operation at step 72.

If there is another split sub-operation to consider at step 74, then the method returns to step 68 and iterates until all the appropriate split sub-operations have been considered. If there is another critical load to consider at step 76, then the method returns to step 64 and iterates until all critical loads have been considered, at which point execution of the Split Critical Loads operation ends. Although described as involving each critical load and each split operation that was deemed acceptable in connection with step 64, the present invention contemplates execution of the Split Critical Loads operation for any appropriate subset of critical loads in an existing solution and any suitable subset of split sub-operations for a critical load.

Figure 5:
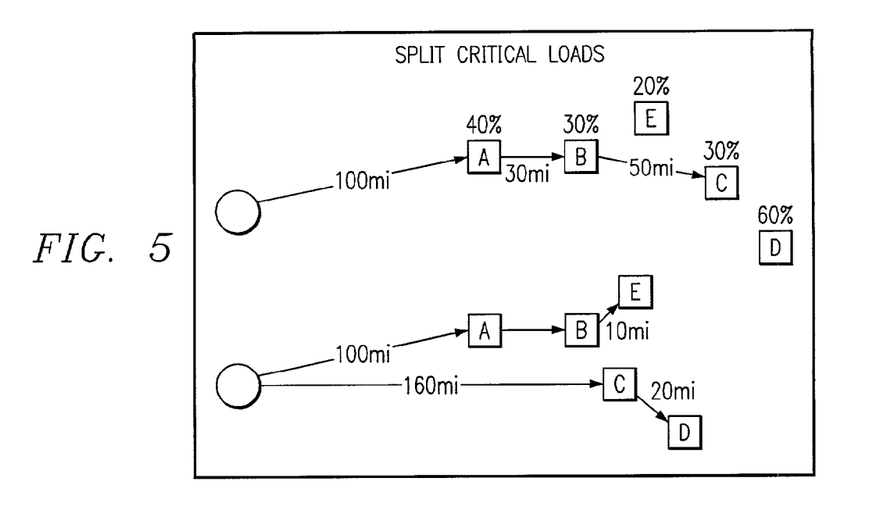
FIG. 5 illustrates a simple example scenario involving execution of a Split Critical Loads operation.

FIG. 5 illustrates a simple example scenario involving execution of the Split Critical Loads operation. As shown in the upper diagram of FIG. 5, suppose we have five shipments to A, B, C, D, and E. Shipments to A, B, and C are critical, but shipments to D and E are non-critical. Suppose we initially build a critical load ABC and apply the Split Critical Loads operation as an attempt to improve the associated solution. There are two ways to split this critical load, either into (A, BC) or (AB, C). For (A, BC), the distance savings is the distance between A and B, which is 30 miles. For (AB, C), the distance savings is the distance between B and C, which is 50 miles. Based on the distance savings, the (AB, C) split will be attempted first.

After the split, based on an appropriate MaxNeighborhoodDistance, 25 miles for example, the future shipment to D is used to fill load C and the future shipment to E is used to fill load AB. The resulting loads are shown in the lower diagram. Now we calculate the unit cost to determine whether the changes associated with the (AB, C) split should be accepted. For simplicity, assume a cost of $1 per mile. Distances for the shipments from the origin are d(A)=100, d(B)=130, d(C)=160, d(D)=180, and d(E)=140. The products of the distance and percent full for each shipment are p(A)=100*0.4=40, p(B)=130*0.3=39, p(C)=160*0.3=48, p(D)=180*0.6= 108, p(E)=140*0.2=28. Thus, for the original critical load ABC, the unit cost is 180/(40+39+48)=1.42, and for the new loads, the unit cost is (140+180)/(40+39+48+108+28)=1.22. Since 1.22<1.42, improvement is made and the changes are accepted. In one embodiment, the split (A, BC) will not be attempted since changes have already been made (i.e. load ABC no longer exists to split).

Figure 6:
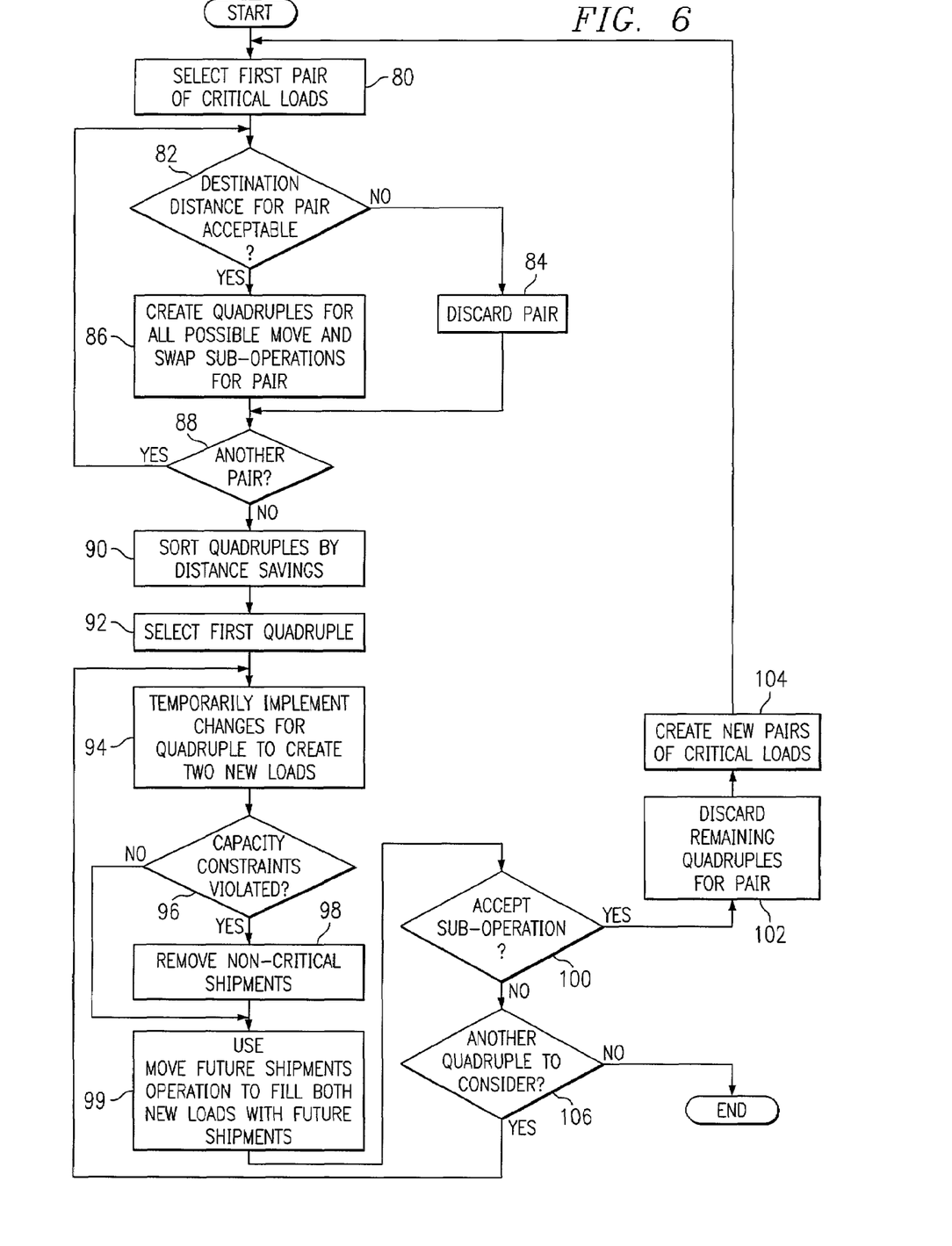
FIG. 6 illustrates example execution of an Optimize Critical Loads operation.

FIG. 6 illustrates example execution of the Optimize Critical Loads operation by optimizer 16. In general, given critical loads of an existing solution, the Optimize Critical Loads operation moves a sequence of stops from one critical load to another or swaps two sequences of stops between two critical loads, and may remove future shipments to make room for critical shipments or add future shipments to fill critical loads. The Optimize Critical Loads operation is a type of k-opt operation and includes a move sub-operation to move a sequence of stops from one load to another and a swap sub-operation to swap two sequences of stops between two loads. A move sub-operation can be denoted by a quadruple (A, B, S, P), where S is a sequence of stops of load A to be inserted at position P of load B. A swap sub-operation can be denoted by a quadruple (A, B, S1, S2), where S1 is a sequence of stops of load A to be swapped with a sequence S2 of stops load B.

In one embodiment, the parameters for the Optimize Critical Loads operation are MaxNeighborhoodDistance, MaxInsertionPercent, MaxDestinationDistance, MinPercentFullRequired, and MinDistanceSavings, without limitation. Parameters may be received from a user using user interface 12, retrieved from database 18, or accessed in any other suitable manner. As for the Split Critical Loads operation, the MinPercentFullRequired parameter is preferably used to define whether a load is executable, although one or more other or additional parameters may be used for this purpose if appropriate. The MinDistanceSavings parameter may be used to eliminate moves and swaps that do not appear sufficiently promising, of which there may be many. The MaxNeighborhoodDistance and MaxInsertionPercent parameters are, as described more fully below, used for the Move Future Shipments operation after a move or swap sub-operation has been executed.

Example execution of the Optimize Critical Loads operation begins at step 80, where optimizer 16 selects a first pair of critical loads, referred to as loads A and B for simplicity. In one embodiment, due to the very large number of possible move and swap sub-operations for each pair of critical loads, the search space is narrowed by discarding the pair of critical loads if their destination distance is greater than the MaxDestinationDistance parameter. Thus, if the destination distance for the pair is not acceptable according to the MaxDestinationDistance parameter at step 82, then the pair is discarded at step 84 and a next pair of critical loads may be selected (which may include one of the critical loads included in the previous pair). Otherwise, the optimizer 16 creates quadruples for all the possible move and swap sub-operations between the critical loads of the pair at step 86. As with the Split Critical Loads operation, optimizer 16 may estimate whether it is possible for a sub-operation to create two executable loads by examining all future shipments in the neighborhood for the critical loads in the pair. A quadruple for a sub-operation resulting in nonexecutable loads may be discarded. If there is another pair of critical loads to be considered at step 88, then execution returns to step 82 and iterates until all suitable quadruples have been considered. If all pairs of critical loads have been considered at step 88, then at step 90 optimizer 16 sorts all the quadruples for all pairs by distance savings, which may be calculated as described above for the Split Critical Loads operation.

Optimizer 16 selects the first quadruple (preferably the quadruple with the largest distance savings) at step 92 and makes temporary changes to implement the sub-operation on the pair to create two new loads at step 94. If capacity constraints are violated at step 96, then optimizer 16 removes all future shipments from the two new loads at step 98 and uses the Move Future Shipments operation to fill both new loads with future shipments at step 99. If capacity constraints are not violated at step 96, then optimizer 16 proceeds directly to step 99. If both of the new loads have a percent full more than MinPercentFullRequired and the unit cost across all critical loads is improved, then all the temporary changes associated with the sub-operation are accepted at step 100. If not, the sub-operation is rejected at step 100, temporary changes are discarded, and the next quadruple is attempted.

In one embodiment, if loads A and B are changed to loads A' and B' after one successful sub-operation (accepted at step 100), optimizer 16 discards all remaining quadruples involving loads A or B at step 102, creates new pairs of critical loads involving loads A' and/or B' at step 104, and then returns to step 80 where execution continues in the manner described above. However, in this case steps 80 through 86 preferably concern only the new pairs and associated quadruples. That is, only new critical load pairs that involve loads A' and/or B' will be considered for selection at step 80 and, accordingly, quadruples are created only for the selected new critical load pair at step 86. Quadruples not involving loads A or B are unaffected by the sub-operation accepted at step 100 and remain in the pool of all possible quadruples. The distance savings for each new quadruple is determined and, at step 90, all possible quadruples (including the new quadruples) are sorted by distance savings before the next quadruple is selected.

If the sub-operation is not accepted at step 100 and there is another quadruple to consider at step 106, execution returns to step 94. If there is not another quadruple to consider at step 106, execution of the Optimize Critical Loads operation ends. While described as involving each pair of critical loads (those existing before the Optimize Critical Loads operation begins as well as those that are created as a result of successful sub-operations accepted at step 100) and each quadruple that is deemed acceptable in connection with step 90, the present invention contemplates executing the Optimize Critical Loads operation for any suitable subset of pairs of critical loads and any suitable subset of quadruples for a pair of critical loads.

Figure 7:
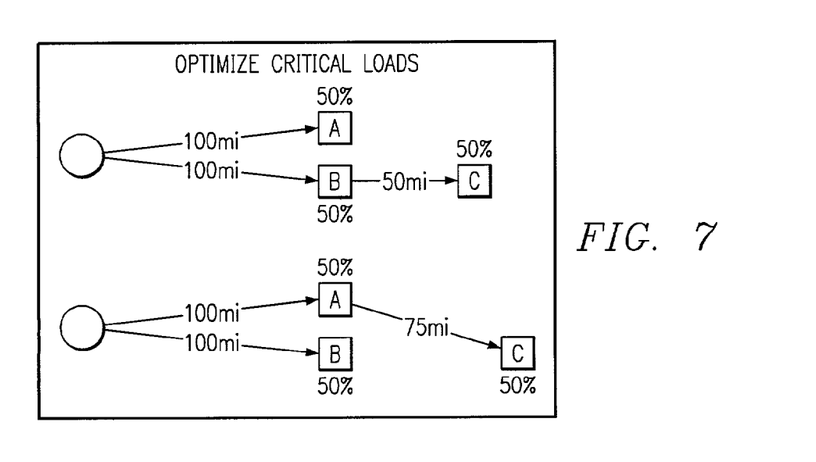
FIG. 7 illustrates a simple example scenario involving execution of an Optimize Critical Loads operation.

FIG. 7 illustrates a simple example scenario involving execution of a swap sub-operation of the Optimize Critical Loads operation. As shown in the upper diagram of FIG. 7, there are three shipments with destinations A, B, and C. Each of the shipments is 50% full. Assume that A and C are critical shipments, while B is non-critical. For simplicity, also assume the cost is $1 per mile. Without regard to criticality, the best solution is two loads A and BC for which the total cost is 100+100+50=$250. Starting with this solution, we can use the Optimize Critical Loads operation to find the optimal solution when criticality is considered. Consider for example the sub-operation of moving the shipment to destination A from load A to load BC, as shown in the lower diagram. Since load BC is already full (the shipments to destinations B and C each consume 50% at the origin of the load), the shipment to destination B is removed from load BC to make room for the shipment to destination A. The new loads are AC and B.

Now we determine whether an improvement has been made by comparing the unit cost of the first solution (A, BC) with the unit cost of the second solution (AB, C). First, the product of the distance and percent full is calculated for each shipment. For the shipments to A and to B this is 100*0.5=50 and for the shipment to C this is 150*0.5=75. For the first solution, there are two critical loads A and BC and the unit cost for the critical loads is:

$$250/(50+50+75)=1.43.$$

For the new solution, there is only one critical load AC the cost is 100+75=175 and the unit cost is:

$$175/(50+75)=1.4.$$

Since 1.4<1.43, the changes associated with the move sub-operation are accepted, in fact yielding the optimal solution for this simple scenario. Note, however, that the total cost has increased from $250 to $275. This is not surprising since the objective for a VRP with criticality constraints according to the present invention is different from that of a basic VRP.

Figure 8:
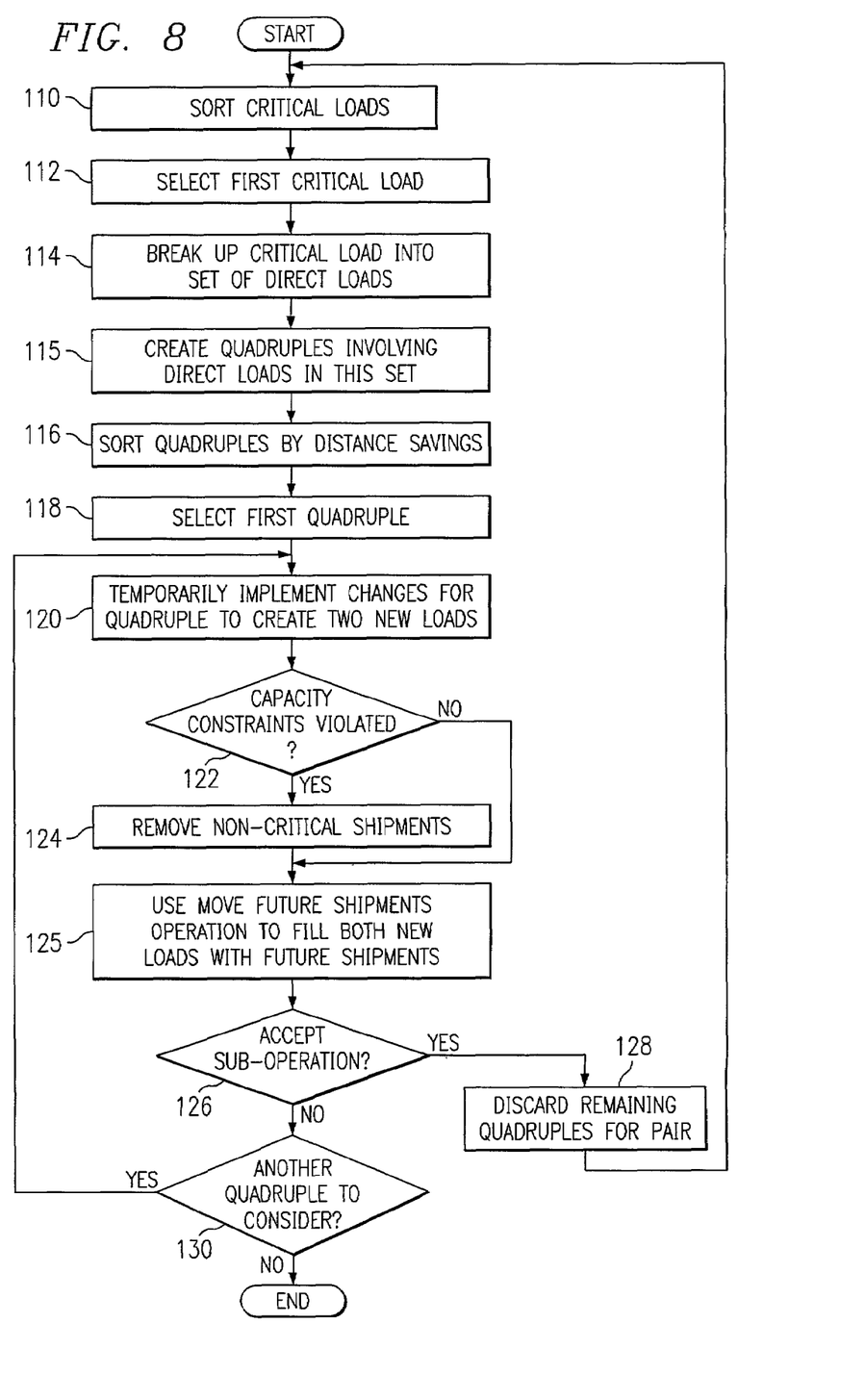
FIG. 8 illustrates example execution of a Re-Optimize Critical Loads operation.

FIG. 8 illustrates example execution of the Re-Optimize Critical Loads operation by optimizer 16. In general, as described above, the Re-Optimize Critical Loads operation breaks up a light multi-stop (indirect) critical load into a set of direct critical loads and applies the Optimize Critical Loads operation to these new direct critical loads along with all other critical loads. In one embodiment, a critical load is considered light if its percent full is less than a MinPercentFullRequired parameter. Changes are preferably ultimately committed if and only if the unit cost considering all critical loads is improved. In one embodiment, the Re-Optimize Critical Loads operation implements a particular type of "tabu" search in which the cost is permitted to increase as a result of breaking up a load, but only subsequent Optimize Critical Loads operations resulting in unit cost improvements are permitted. Parameters for the Re-Optimize Critical Loads operation may be the same as those for the Optimize Critical Loads operation described above, although any suitable parameters may be used according to particular needs.

Example execution of the Re-Optimize Critical Loads operation begins at step 110, where optimizer 16 may sort all the critical loads within the existing solution by priority, if any, and then within priority by decreasing percent full, as also described above with reference to the Move Future Shipments operation and the Split Critical Loads operation. This may allow the most important and fullest critical loads to be broken up first. Alternative embodiments may omit such sorting of critical loads. Optimizer 16 selects a first critical load at step 112. In one embodiment, the critical load must be multi-stop and have percent full greater than MinPercentFullRequired. At step 114, optimizer 16 breaks up the critical load into a set of direct critical loads, denoted for simplicity by S. At step 115, for each direct critical load contained in set S, the optimizer 16 uses the direct critical load as a seed to create quadruples with all the critical loads not contained in set S. The Re-Optimize Critical Loads operation then proceeds as for the Optimize Critical Loads operation described above.

Therefore, at step 116, optimizer 16 sorts the quadruples by distance savings, which may be calculated as described above. As with the Split Critical Loads and Optimize Critical Loads operations, optimizer 16 may estimate whether it is possible to create two executable loads by examining all future shipments in the neighborhood for the critical loads in the pair associated with a quadruple. A quadruple for a sub-operation resulting in non-executable loads may be discarded. Optimizer 16 selects the first quadruple (preferably the quadruple with the largest distance savings) at step 118 and makes temporary changes to implement the sub-operation on the pair to create two new loads at step 120. If capacity constraints are violated at step 122, optimizer 16 removes all future shipments from the two new loads at step 124 and uses the Move Future Shipments operation to fill both these new loads with future shipments at step 125. If capacity constraints are not violated at step 122, optimizer 16 proceeds directly to step 125. If both new loads have a percent full more than MinPercentFullRequired and the unit cost across all the critical loads is improved, then all the temporary changes associated with the sub-operation are accepted at step 126. If not, the sub-operation is rejected at step 126, the temporary changes are discarded, and the next quadruple is attempted.

In one embodiment, if loads A and B are changed to loads A' and B' after one successful sub-operation, optimizer 16 discards all remaining quadruples involving A or B at step 128 and returns to step 110, where the critical loads (including the new direct critical loads created as a result of the sub-operation accepted at step 126) are again sorted. If the sub-operation is not accepted at step 126 and there is another quadruple to consider at step 130, then execution returns to step 120. If there is not another quadruple to consider at step 130, then execution of the Re-Optimize Critical Loads operation ends. Although described as involving each critical load (both those existing before the Re-Optimize Critical Loads operation begins and those created as a result of successful sub-operations accepted at step 126), and each quadruple that is deemed acceptable in connection with step 116, the present invention contemplates executing the Re-Optimize Critical Loads operation for any suitable subset of critical loads and any suitable subset of quadruples for a critical load.

Figure 9:
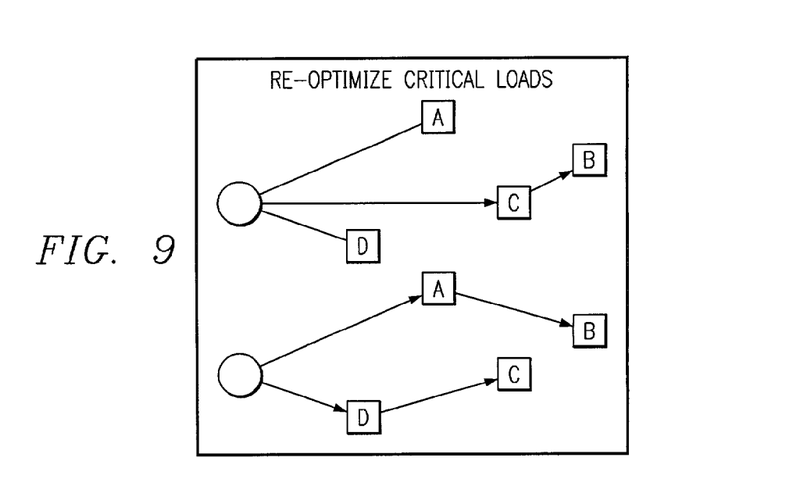
FIG. 9 illustrates a simple example scenario involving execution of a Re-Optimize Critical Loads operation.

FIG. 9 illustrates a simple example scenario involving execution of the Re-Optimize Critical Loads operation. Re-Optimize Critical Loads operation may be necessary or desirable because the Optimize Critical Loads operation may often be trapped in a local minimum. As shown in the upper diagram of FIG. 9, suppose load BC is light and that it is unlikely that the Optimize Critical Loads operation will improve the solution because the first move or swap sub-operation will increase the cost. With the Re-Optimize Critical Loads operation, as shown in the lower diagram, the load BC is broken up into load B and load C and the Optimize Critical Loads operation is applied to move the shipment to destination A to load B and the shipment to destination D to load C, both of which are cost savings moves. In the end, the solution is improved as shown.

Figure 10:
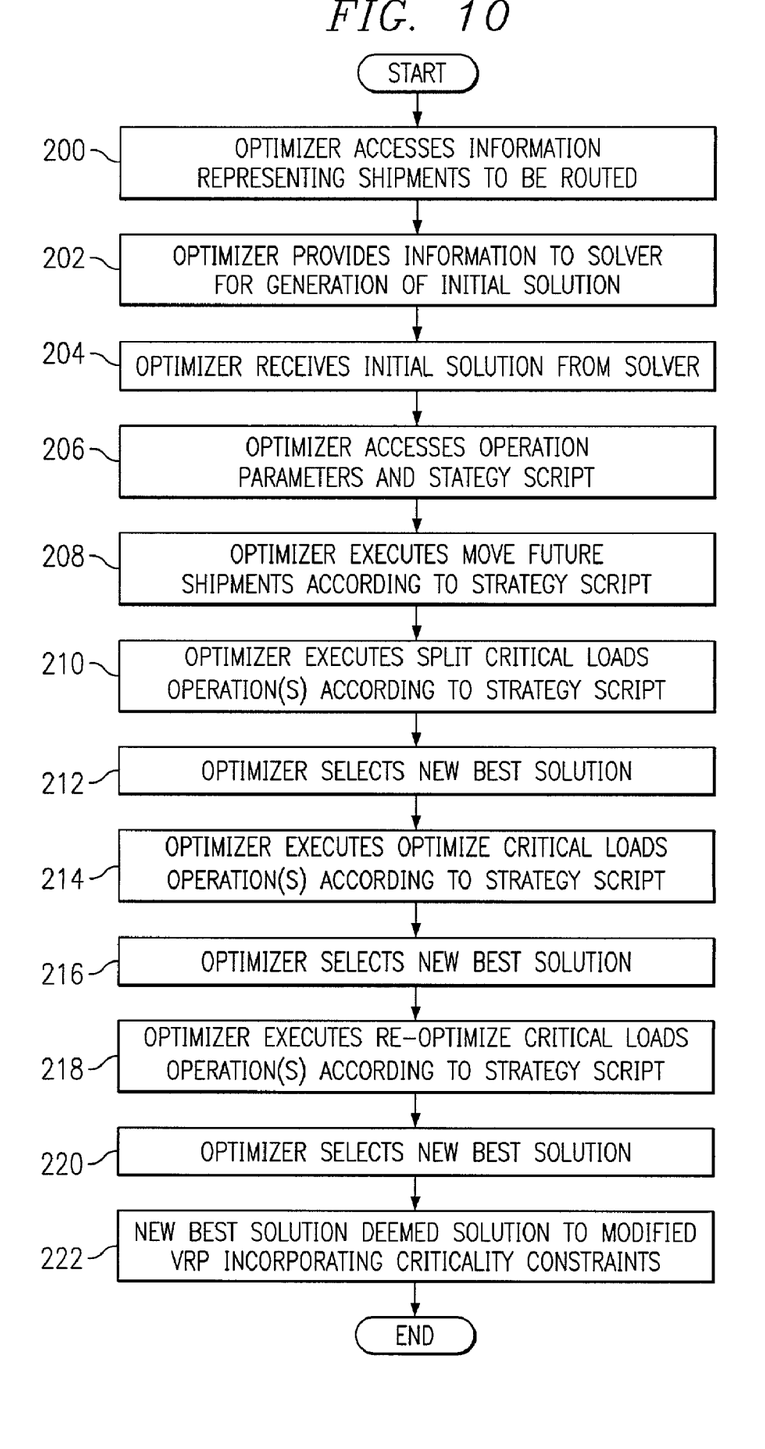
FIG. 10 illustrates an example method for routing shipments according to criticality.

FIG. 10 illustrates an example method for routing shipments according to criticality. The method begins at step 200, where during an initialization stage optimizer 14 accesses information representing the shipments to be routed. At step 202, optimizer 14 provides this information to the solver 16 for generation of an initial solution to a basic VRP and, at step 204, receives the initial solution from the solver 16. At step 206, before, substantially simultaneous with, or after causing the initial solution to be generated, optimizer 14 accesses the parameters optimizer 14 will use to execute one or more operations and accesses a strategy script or other instructions that specify the order in which optimizer 14 will execute the operations. Optimizer 14 may receive this information from a user through user interface 12, retrieve the information from database 18, or access the information in any other appropriate manner. Moreover, optimizer 14 may access parameters for all operations substantially simultaneously, may wait until shortly before executing an operation to access associated parameters, or may access parameters in any other manner.

During the construction stage, at step 208, optimizer 14 may execute the Move Future Shipments operation to fill each critical load in the initial solution with future shipments that are in an appropriate neighborhood of the critical load. During an improvement stage, at steps 210–220, optimizer 14 may execute one or more local search operations to improve the initial solution (preferably as modified according to execution of the Move Future Shipments operation). In the illustrated embodiment, optimizer 14 applies the Split Critical Loads operation to each critical load within the initial solution at step 210, selects a new best solution at step 212, applies the Optimize Critical Loads operation to the appropriate pairs of critical loads in the current best solution at step 214, selects a new best solution at step 216, applies the Re-Optimize Critical Loads operation to each critical load in the current best solution at step 218, and selects a new best solution at step 220. In this particular embodiment, the new best solution selected at step 220 is deemed the solution to the modified VRP incorporating criticality constraints at step 222, and the method ends. Those skilled in the art will appreciate that, although a particular solution strategy has been described, the present invention encompasses any solution strategy falling within the scope of the claims appended hereto.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for routing shipments according to criticality, the system comprising one or more software components collectively operable to:

access an initial solution to an optimization problem of routing a plurality of predetermined shipments to a plurality of predetermined locations using a plurality of vehicles, the initial solution comprising a plurality of loads such that each shipment is routed within exactly one load and a global cost across all the loads is minimized, the initial solution being generated independent of the criticality of the shipments;

insert, into each of one or more critical loads in a current solution, one or more non-critical shipments that are within a neighborhood of the critical load, a critical load being a load containing at least one critical shipment; and execute one or more local search operations to improve the initial solution, the executed local search operations comprising at least one of:

a first operation comprising splitting each of one or more selected critical loads in a current solution into two new critical loads;

a second operation comprising, for each of one or more selected pairs of critical loads in a current solution, performing at least one of moving a sequence of stops from one critical load in the pair to the other critical load in the pair and swapping two sequences of stops between the critical loads in the pair; and a third operation comprising, for each of one or more selected critical loads in a current solution that are indirect critical loads having at least one in-transit stop, breaking up the indirect critical load into a plurality of new direct critical loads having no in-transit stops and for each of one or more selected pairs of critical loads, each selected pair of critical loads including at least one new direct critical load, performing at least one of moving a sequence of stops from one critical load in the pair to the other critical load in the pair and swapping two sequences of stops between the critical loads in the pair.

2. The system of claim 1 wherein the optimization problem is a basic Vehicle Routing Problem (VRP) and the initial solution is a solution to the basic VRP.

3. The system of claim 1, wherein a critical shipment is a shipment that must be delivered in a current time period and a non-critical shipment is a shipment that may be delivered in a future time period.

4. The system of claim 1, wherein a non-critical shipment is inserted into a critical load only if the resulting critical load is executable and doing so does not increase the global cost by more than a predetermined amount.

5. The system of claim 1, wherein for each critical load that may be split using operation (a), the optimizer is further operable to:

determine a distance savings associated with each possible split of the critical load;

sort the possible splits in order of decreasing distance savings;

select the first possible split in the sorted order for evaluation; and temporarily split the critical load into two new critical loads according to the selected possible split, insert into the two new critical loads the or more non-critical shipments that are within neighborhoods of the two new critical loads, accept the split if both new critical loads are fuller than a predetermined amount after insertion of the non-critical shipments and a unit cost across all critical loads is improved as a result of the split, else discard the split and select the next possible split for evaluation.

6. The system of claim 1, wherein a critical load may be split only if the critical load includes at least one in-transit stop, the critical load has a fullness that exceeds a predetermined threshold, and the optimizer estimates there are sufficient non-critical shipments within a neighborhood of the critical load to make the two new critical loads executable if they are filled with these non-critical shipments.

7. The system of claim 1, wherein for each selected pair of critical loads for the second operation, the optimizer is further operable to:

determine a quadruple for each possible move and each possible swap between the critical loads of the pair, a quadruple for a move specifying a first critical load of the pair, a second critical load of the pair, a sequence of stops of the first critical load to be moved, and a position of the second critical load at which the sequence of stops is to be inserted, a quadruple for a swap specifying a first critical load of the pair, a second critical load of the pair, a first sequence of stops of the first critical load, and a second sequence of stops of the second critical load to be swapped with the first sequence of stops;

determine a distance savings associated with each quadruple;

sort the quadruples in order of decreasing distance savings;

select the first quadruple in the sorted order for evaluation; and temporarily implement the move or swap associated with the selected quadruple to create two new critical loads, accept the move or swap if both new critical loads are fuller than a predetermined amount and a unit cost across all critical loads is improved as a result of the move or swap, else discard the move or swap and select the next quadruple for evaluation.

8. The system of claim 7, wherein the optimizer is further operable to:
determine a destination distance associated with each pair of critical loads; and
determine quadruples only for pairs of critical loads having associated destination distances exceeding a predetermined threshold.

9. The system of claim 7, wherein a quadruple is considered only if the optimizer estimates there are sufficient non-critical shipments within neighborhoods of the critical loads in the pair to make these critical loads executable if they are filled with these non-critical shipments after the associated move or swap occurs.

10. The system of claim 7, wherein if one or more capacity constraints are violated for a new critical load created as a result of the move or swap, the optimizer is further operable to remove all non-critical shipments from the new critical load and insert into the new critical load one or more non-critical shipments within a neighborhood of the new critical load, provided the resulting new critical load is executable and doing so does not increase the global cost by more than a predetermined amount.

11. The system of claim 7, wherein following acceptance of the move or swap on the critical loads of the pair, the optimizer is further operable to:
discard all remaining quadruples involving these original critical loads;
determine a plurality of new pairs of critical loads involving the two new critical loads created as a result of the move or swap;
determine a new quadruple for each possible move and swap between the critical loads of each new pair;
determine a distance savings associated with each new quadruple; and
sort all quadruples, including the previously existing quadruples and the new quadruples, in order of decreasing distance savings before selecting the next quadruple for evaluation.

12. The system of claim 7, wherein for the third operation the optimizer is further operable to:
given a set comprising all the new direct critical loads created, determine a new quadruple for each possible move and swap between the new direct critical loads in the set and all critical loads not in the set;
determine a distance savings associated with each new quadruple;
sort the new quadruples in order of decreasing distance savings;
select the first new quadruple in the sorted order for evaluation; and
temporarily implement the move or swap associated with the selected new quadruple to create two additional critical loads, accept the move or swap if both additional critical loads are fuller than a predetermined amount and a unit cost across all critical loads is improved as a result of the move or swap, else discard the move or swap and select the next new quadruple for evaluation.

13. The system of claim 12, wherein a critical load may be broken up only if the critical load has a fullness below a predetermined threshold and the optimizer estimates that there are sufficient non-critical shipments within neighborhoods of the new critical loads to make the new critical loads executable if they are filled with these non-critical shipments.

14. A computer-implemented method for routing shipments according to criticality, comprising:
accessing an initial solution to an optimization problem of routing a plurality of predetermined shipments to a plurality of predetermined locations using a plurality of vehicles, the initial solution comprising a plurality of loads such that each shipment is routed within exactly one load and a global cost across all the loads is minimized, the initial solution being generated independent of the criticality of the shipments;
inserting, into each of one or more critical loads in a current solution, one or more non-critical shipments that are within a neighborhood of the critical load, a critical load being a load containing at least one critical shipment; and
executing one or more local search operations to improve the initial solution, the executed local search operations comprising at least one of:
a first operation comprising splitting each of one or more selected critical loads in a current solution into two new critical loads;
a second operation comprising, for each of one or more selected pairs of critical loads in a current solution, performing at least one of moving a sequence of stops from one critical load in the pair to the other critical load in the pair and swapping two sequences of stops between the critical loads in the pair; and
a third operation comprising, for each of one or more selected critical loads in a current solution that are indirect critical loads having at least one in-transit stop, breaking up the indirect critical load into a plurality of new direct critical loads having no in-transit stops and for each of one or more selected pairs of critical loads, each selected pair of critical loads including at least one new direct critical load, performing at least one of moving a sequence of stops from one critical load in the pair to the other critical load in the pair and swapping two sequences of stops between the critical loads in the pair.

15. The method of claim 14, wherein the optimization problem is a basic Vehicle Routing Problem (VRP) and the initial solution is a solution to the basic VRP.

16. The method of claim 14, wherein a critical shipment is a shipment that must be delivered in a current time period and a non-critical shipment is a shipment that may be delivered in a future time period.

17. The method of claim 14, wherein a non-critical shipment is inserted into a critical load only if the resulting critical load is executable and doing so does not increase the global cost by more than a predetermined amount.

18. The method of claim 14, further comprising, for each critical load that may be split using operation (a):
   determining a distance savings associated with each possible split of the critical load;
   sorting the possible splits in order of decreasing distance savings;
   selecting the first possible split in the sorted order for evaluation; and
   temporarily splitting the critical load into two new critical loads according to the selected possible split, inserting into the two new critical loads one or more non-critical shipments that are within neighborhoods of the two new critical loads, accepting the split if both new critical loads are fuller than a predetermined amount after insertion of the non-critical shipments and a unit cost across all critical loads is improved as a result of the split, else discarding the split and select the next possible split for evaluation.

19. The method of claim 14, wherein a critical load may be split only if the critical load includes at least one in-transit stop, the critical load has a fullness that exceeds a predetermined threshold, and it is estimated that there are sufficient non-critical shipments within a neighborhood of the critical load to make the two new critical loads executable if they are filled with these non-critical shipments.

20. The method of claim 14, further comprising, for each selected pair of critical loads for the second operation:
   determining a quadruple for each possible move and each possible swap between the critical loads of the pair, a quadruple for a move specifying a first critical load of the pair, a second critical load of the pair, a sequence of stops of the first critical load to be moved, and a position of the second critical load at which the sequence of stops is to be inserted, a quadruple for a swap specifying a first critical load of the pair, a second critical load of the pair, a first sequence of stops of the first critical load, and a second sequence of stops of the second critical load to be swapped with the first sequence of stops;
   determining a distance savings associated with each quadruple;
   sorting the quadruples in order of decreasing distance savings;
   selecting the first quadruple in the sorted order for evaluation; and
   temporarily implementing the move or swap associated with the selected quadruple to create two new critical loads, accepting the move or swap if both new critical loads are fuller than a predetermined amount and a unit cost across all critical loads is improved as a result of the move or swap, else discarding the move or swap and select the next quadruple for evaluation.

21. The method of claim 20, further comprising:
   determining a destination distance associated with each pair of critical loads; and
   determining quadruples only for pairs of critical loads having associated destination distances exceeding a predetermined threshold.

22. The method of claim 20, wherein a quadruple is considered only if it is estimated that there are sufficient non-critical shipments within neighborhoods of the critical loads in the pair to make these critical loads executable if they are filled with these non-critical shipments after the associated move or swap occurs.

23. The method of claim 20, further comprising, if one or more capacity constraints are violated for a new critical load created as a result of the move or swap, removing all non-critical shipments from the new critical load and inserting into the new critical load one or more non-critical shipments within a neighborhood of the new critical load, provided the resulting new critical load is executable and doing so does not increase the global cost by more than a predetermined amount.

24. The method of claim 20, further comprising, following acceptance of the move or swap on the critical loads of the pair:
   discarding all remaining quadruples involving these original critical loads;
   determining a plurality of new pairs of critical loads involving the two new critical loads created as a result of the move or swap;
   determining a new quadruple for each possible move and swap between the critical loads of each new pair,
   determining a distance savings associated with each new quadruple; and
   sorting all quadruples, including the previously existing quadruples and the new quadruples, in order of decreasing distance savings before selecting the next quadruple for evaluation.

25. The method of claim 20, further comprising for the third operation:
   given a set comprising all the new direct critical loads created, determining a new quadruple for each possible move and swapping between the new direct critical loads in the set and all critical loads not in the set;
   determining a distance savings associated with each new quadruple;
   sorting the new quadruples in order of decreasing distance savings;
   selecting the first new quadruple in the sorted order for evaluation; and
   temporarily implementing the move or swap associated with the selected new quadruple to create two additional critical loads, accepting the move or swap if both additional critical loads are fuller than a predetermined amount and a unit cost across all critical loads is improved as a result of the move or swap, else discarding the move or swap and select the next new quadruple for evaluation.

26. The method of claim 25, wherein a critical load may be broken up only if the critical load has a fullness below a predetermined threshold and it is estimated that there are sufficient non-critical shipments within neighborhoods of the new critical loads to make the new critical loads executable if they are filled with these non-critical shipments.

27. Software for routing shipments according to criticality, the software being embodied in computer-readable media and when executed operable to:
   access an initial solution to an optimization problem of routing a plurality of predetermined shipments to a plurality of predetermined locations using a plurality of vehicles, the initial solution comprising a plurality of loads such that each shipment is routed within exactly one load and a global cost across all the loads is minimized, the initial solution being generated independent of the criticality of the shipments;
   insert, into each of one or more critical loads in a current solution, one or more non-critical shipments that are within a neighborhood of the critical load, a critical load being a load containing at least one critical shipment; and execute one or more local search operations to improve the initial solution, the executed local search operations comprising at least one of:
- a first operation comprising splitting each of one or more selected critical loads in a current solution into two new critical loads;
- a second operation comprising, for each of one or more selected pairs of critical loads in a current solution, performing at least one of moving a sequence of stops from one critical load in the pair to the other critical load in the pair and swapping two sequences of stops between the critical loads in the pair; and
- a third operation comprising, for each of one or more selected critical loads in a current solution that are indirect critical loads having at least one in-transit stop, breaking up the indirect critical load into a plurality of new direct critical loads having no in-transit stops and for each of one or more selected pairs of critical loads, each selected pair of critical loads including at least one new direct critical load, performing at least one of moving a sequence of stops from one critical load in the pair to the other critical load in the pair and swapping two sequences of stops between the critical loads in the pair.

28. A computer-implemented system for routing shipments according to criticality, comprising:

means for accessing an initial solution to an optimization problem of routing a plurality of predetermined shipments to a plurality of predetermined locations using a plurality of vehicles, the initial solution comprising a plurality of loads such that each shipment is routed within exactly one load and a global cost across all the loads is minimized, the initial solution being generated independent of the criticality of the shipments;

means for inserting, into each of one or more critical loads in a current solution, one or more non-critical shipments that are within a neighborhood of the critical load, a critical load being a load containing at least one critical shipment; and means for executing one or more local search operations to improve the initial solution, the executed local search operations comprising at least one of:
- a first operation comprising splitting each of one or more selected critical loads in a current solution into two new critical loads;
- a second operation comprising, for each of one or more selected pairs of critical loads in a current solution, performing at least one of moving a sequence of stops from one critical load in the pair to the other critical load in the pair and swapping two sequences of stops between the critical loads in the pair; and
- a third operation comprising, for each of one or more selected critical loads in a current solution that are indirect critical loads having at least one in-transit stop, breaking up the indirect critical load into a plurality of new direct critical loads having no in-transit stops and for each of one or more selected pairs of critical loads, each selected pair of critical loads including at least one new direct critical load, performing at least one of moving a sequence of stops from one critical load in the pair to the other critical load in the pair and swapping two sequences of stops between the critical loads in the pair.

29. The software of claim 27, wherein for each selected critical load pair for the second operation, the software further operable to:
- determine a quadruple for each possible move and each possible swap between the critical loads of the pair, a quadruple for a move specifying a first critical load of the pair, a second critical load of the pair, a sequence of stops of the first critical load to be moved, and a position of the second critical load at which the sequence of stops is to be inserted, a quadruple for a swap specifying a first critical load of the pair, a second critical load of the pair, a first sequence of stops of the first critical load, and a second sequence of stops of the second critical load to be swapped with the first sequence of stops;
- determine a distance savings associated with each quadruple;
- sort the quadruples in order of decreasing distance savings;
- select the first quadruple in the sorted order for evaluation; and
- temporarily implement the move or swap associated with the selected quadruple to create two new critical loads, accept the move or swap if both new critical loads are fuller than a predetermined amount and a unit cost across all critical loads is improved as a result of the move or swap, else discard the move or swap and select the next quadruple for evaluation.

30. The software of claim 27, further operable to:
- determine a destination distance associated with each pair of critical loads; and
- determine quadruples only for pairs of critical loads having associated destination distances exceeding a predetermined threshold.

31. The software of claim 27, wherein a quadruple is considered only if the software estimates there are sufficient non-critical shipments within neighborhoods of the critical loads in the pair to make these critical loads executable if they are filled with these non-critical shipments after the associated move or swap occurs.

32. The software of claim 27, wherein if one or more capacity constraints are violated for a new critical load created as a result of the move or swap, the software is further operable to remove all non-critical shipments from the new critical load and insert into the new critical load one or more non-critical shipments within a neighborhood of the new critical load, provided the resulting new critical load is executable and doing so does not increase the global cost by more than a predetermined amount.

33. The software of claim 27, wherein following acceptance of the move or swap on the critical loads of the pair, the software further operable to:
- discard all remaining quadruples involving these original critical loads;
- determine a plurality of new pairs of critical loads involving the two new critical loads created as a result of the move or swap;
- determine a new quadruple for each possible move and swap between the critical loads of each new pair;
- determine a distance savings associated with each new quadruple; and
- sort all quadruples, including the previously existing quadruples and the new quadruples, in order of decreasing distance savings before selecting the next quadruple for evaluation.

34. The software of claim 27, wherein for the third operation the software is further operable to:
given a set comprising all the new direct critical loads created, determine a new quadruple for each possible move and swap between the new direct critical loads in the set and all critical loads not in the set;
determine a distance savings associated with each new quadruple;
sort the new quadruples in order of decreasing distance savings;
select the first new quadruple in the sorted order for evaluation; and
temporarily implement the move or swap associated with the selected new quadruple to create two additional critical loads, accept the move or swap if both additional critical loads are fuller than a predetermined amount and a unit cost across all critical loads is improved as a result of the move or swap, else discard the move or swap and select the next new quadruple for evaluation.

35. The software of claim 27, wherein a critical load may be broken up only if the critical load has a fullness below a predetermined threshold and the software estimates that there are sufficient non-critical shipments within neighborhoods of the new critical loads to make the new critical loads executable if they are filled with these non-critical shipments.

* * * * *